United States Patent [19]

Witte

[11] Patent Number: 4,649,012
[45] Date of Patent: Mar. 10, 1987

[54] METHOD OF SHAPING AN ELONGATED PRODUCT

[75] Inventor: Karl H. Witte, Hilter, Fed. Rep. of Germany

[73] Assignee: Maschinen Witte KG, Hilter, Fed. Rep. of Germany

[21] Appl. No.: 606,053

[22] Filed: May 2, 1984

Related U.S. Application Data

[62] Division of Ser. No. 269,924, Jun. 2, 1981, Pat. No. 4,468,190.

[30] Foreign Application Priority Data

Jun. 3, 1980 [DE] Fed. Rep. of Germany ........ 3020922
Jun. 3, 1980 [DE] Fed. Rep. of Germany ... 8014748[U]

[51] Int. Cl.$^4$ ................................................ B29C 53/00
[52] U.S. Cl. .................................... 264/285; 264/295; 264/313
[58] Field of Search ............... 425/383, DIG. 44, 392; 264/313, 285, 295; 249/155

[56] References Cited

U.S. PATENT DOCUMENTS

| | | | |
|---|---|---|---|
| 2,739,350 | 3/1956 | Lampman | 264/313 |
| 3,020,587 | 2/1962 | Alderfer et al. | 264/313 |
| 3,562,860 | 2/1971 | Rottner et al. | 425/392 |
| 3,635,642 | 1/1972 | Mueller | 249/155 |

FOREIGN PATENT DOCUMENTS

| | | | |
|---|---|---|---|
| 2053318 | 3/1974 | Fed. Rep. of Germany. | |
| 1491989 | 7/1967 | France | 264/295 |
| 1378287 | 11/1974 | United Kingdom. | |

Primary Examiner—James Derrington
Attorney, Agent, or Firm—Jordan and Hamburg

[57] ABSTRACT

A mold for synthetic resin products which are to be shaped while soft, includes a pair of elongated mold parts each having opposed complementary faces with contours at least partially conforming to at least parts of the product to be shaped. A support means on which the mold parts are mounted provide for moving at least one of the mold parts relative to the other mold part to effect removal therefrom of a finished product. The mold parts are constructed and arranged so as to be bendable along their longitudinal axes to effect a change in arcuate configuration, the mold parts being made of a material which facilitates sliding of the synthetic resin product through the mold, the support means supporting the mold parts in fixed spaced apart disposition as the product is moved longitudinally between the mold parts to thereby impart to the product an arcuate configuration corresponding to the arcuate configuration of the mold parts.

1 Claim, 5 Drawing Figures

METHOD OF SHAPING AN ELONGATED PRODUCT

This is a division of application Ser. No. 269,924, filed June 2, 1984, now U.S. Pat. No. 4,468,190, issued Aug. 28, 1984.

BACKGROUND OF THE INVENTION

The invention relates to a mold for shaping elongated, softened plastic products and more particularly to shaping such products into an arcuate configuration.

Plastic hollow sections for window frames have found wide spread use where the usually plane window borders and frames make it easy to use basically plane special plastic sections for such purposes. The advantages of such sectional construction, highly developed since their inception, have resulted in a need for curved sections of special shapes, particularly when repairing older buildings. Basically, it has been possible to prepare such arches for a long time, particularly according to to a more recent process where preshaped sections are dipped into a special liquid and are heated to a predetermined temperature, 120° C., for instance. Thereafter the sections are easily shaped.

The customary shaping process, however, is afflicted with difficulties. When the sections are bent over a template or are bent within a mold, bulge waves and bulge folds occur along the internally located areas of the arches which depend on the properties of the sections. Furthermore, such specialized arches result in large costs and are time consuming to manufacture due to the relatively large amount of labor because changed arch shapes regularly require new molds or at least molds which are varied sectionally by joining parts thereof. Such dismountable molds frequently result in unacceptable products. These problems which occur frequently in the production of windows are basically applicable not only for these products but generally when forming complicated plastic sections.

An object of the present invention is to provide for the shaping of straight plastic sections into arcuate shapes simpler and more securely as well as more flexibly in respect to various arcuate shapes in order to obtain better and cheaper parts.

According to the invention this objective is achieved with a mold or template according to the disclosure which follows.

In applicant's invention, a mold formed by flexible guide rails allows the curvature of the template to be varied in an easily understood manner by more or less intensive bending in an elastic or a plastic mode and to produce thereby a fast accommodation to varied radii or shapes. Experimental sample or trial arches or arcuate shapes may be prepared and it is also possible to change a shape that is distorted due to cold-flow by correcting such effects. Such corrections may be achieved costing little labor or time. A mold constructed according to such a principle allows also an uninterrupted support for the formed shape which is at least at the beginning relatively soft and does so in the particularly critical inner and outer areas. It creates thereby good conditions for a product free of damages and irregularities or almost free of such defects.

The construction of the mold by aid of guide rails has shown particularly that the work piece may be pulled longitudinally through the mold thereby not only resulting in a steady and well controlled shaping process but also is particularly apt to prevent bulge waves and bulge folds. This procedure of shaping has shown that the customary frequently occurring danger of bulge waves and bulge folds is prevented and that now, after each hardening process, a plastic section may be removed from the mold which is uniform as to its cross section and has a smooth surface. An advantageous embodiment allows entry laterally into the mold with a drawing tool and to pull in this mold a section, held by its head, while the drawing tool follows the mold longitudinally.

A particularly advantageous mold allows the use of an extremely strong and rigid or tough material for the parts of the mold like polyethylene, particularly ultra-high molecular low pressure polyethylene without restrictions when light variations of curvatures occur. Continuous rear edges allow the use of the bending strength of such a material and to retain its property of a sliding or slippery material and still retain the required bendability. While the mold parts change their shape exclusively in their rear area, their cross sectional shape is not impaired. The recesses intruding from the edge particularly prevent dislocations of the material caused by the curvature which could impair the cross sectional shape of the mold.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
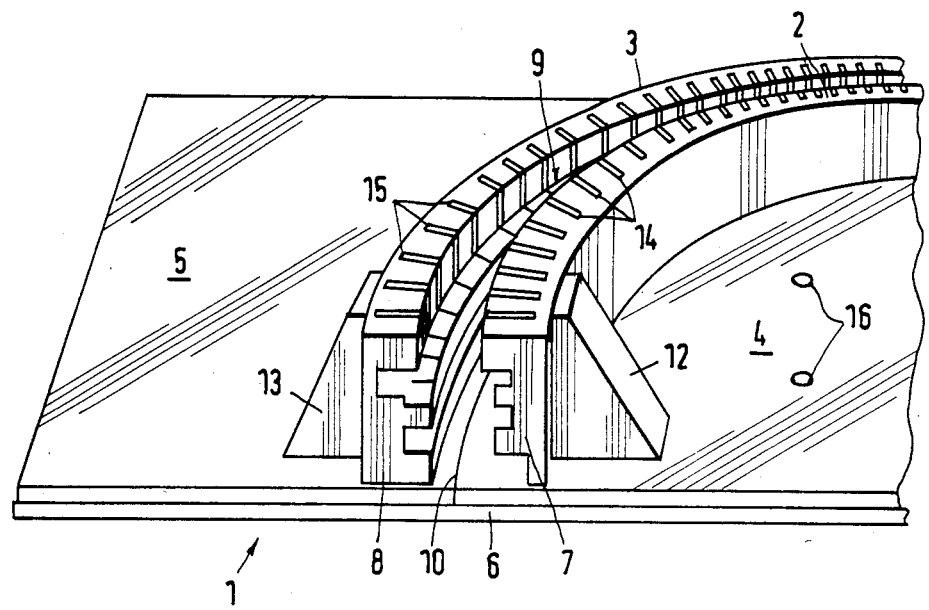
FIG. 1 is a partial perspective view of a mold according to one embodiment of the invention.

Referring to the drawings, FIG. 1 shows a mold, partially broken away, and generally denoted by the numeral 1. The mold 1 consists of two mold parts, namely an inner part 2 and an outer part 3. Each of the parts 2 and 3 are fastened to a mounting plate 4 and 5, respectively, and both mounting plates 4, 5 are disposed upon a common guide plate 6.

Each of the mold parts 2 and 3 consists of a section of high molecular low pressure polyethylene, a material known for its notched bar impact strength, flex-strength, and its property as a slippery raw material and which is recommendable for the present use. Other materials having sufficient flex-strength and sufficient slipperiness may be used, in which case also resistance against temperatures up to 120° C., huidity and noxious chemical substances must be taken into account.

The cross section of the mold parts, which is unimportant on its outer side, is determined on its inner side by the shape of the plastic part to be molded. The parts of the section must abut the inner sides of the mold with little play. Therefore, the frontal planes 7 and 8 of the mold parts 2 and 3 have on their edges facing towards each other, a complex shape adapted to the shape of the plastic part to be shaped. These adapted sectional areas are disposed upon the inner or outer side, respectively, of the arch to be manufactured. The mold parts 2 and 3 keep a distance between these so that no completely closed mold results. In order to save on mold material upon the sides where the mold parts 2 and 3 abut the mounting plates 4 and 5, the mounting plates form the bottom closure of the mold. Furthermore, the accessability of the inside of the mold is here advantageously taken care of.

At the side of the mold parts 2 and 3 facing away from the mounting plates, a permanently shaped free slot 9 is provided which makes it possible to reach into the mold with a tool, for instance a plier-shaped tool. This tool may serve to pull in longitudinally and "head first" a previously softened plastic section between the frontal sides 7 and 8 of the mold parts 2 and 3. Also a drawing tool following the arch shape from its end may be used, and a closed mold cross section may be provided thereby. It has been found that the aforedescribed shape of a mold and this method of feeding-in are particularly simple and easily understood.

The particular manner of shaping, where the softened plastic section is pulled longitudinally into the mold is easily understood because no adjustments of the mold must be performed during the molding operation like a bending operation from both sides against a piece to be molded, as in a conventional mold. This molding operation has been found surprisingly capable of preventing fold and wave phenomena due to dislocations of material caused by the molding process. Waves and folds which had to be fearfully expected in conventional molds and working processes therewith were not found here, a fact which might be apportioned to the uniform sliding intromission into the mold and also to the slight stretching of the whole molded part.

The sectional piece, shaped while softened, remains in the mold 1 between the mold parts 2 and 3 for a period of time sufficient for the prevention of backforming, for instance 5 minutes, and is then taken out. Due to the fact that the mold parts 2 and 3 are disposed upon individual mounting plates 4 and 5, they may be moved apart. That is shown in the drawing by the butt joint 10 and the common rest upon the guide plate 6. It is evident that there are many constructive solutions of this function. The guide plate 6, could, of course, be replaced by rails or struts. The mounting plates 4 and 5 also may be replaced by other planar mounts, where the planarity only serves to define a curving plane for the mold parts and to allow simple changes.

Opposite to the mounting plates 4 and 5, the mold parts 2 and 3 are connected by, only schematically shown, struts 13, which, in the simplest case may have the shape of thrust blocks but may also provide various fastening and regulating means of a known kind for a simple and exact mounting. In order to fix the mold parts 2 and 3 relative to the mounting plates 4 and 5, at least two struts are needed each time arranged at the end. Preferably, though, a plurality of struts will be provided in order to stabilize the mold.

Furthermore, mold 1 allows the provision of variations in the longitudinal shape to be prepared, particularly in the curvature. In this respect it is particularly important that the mold parts 2 and 3 are formed flexible in the sense of changes of longitudinal curvatures, so that the mold parts may be bent more or less and also be bent non-uniformly along their length, and that they may be fastened to the mounting plates 4 and 5 in the shapes thusly obtained. For that purpose, an elastic material is most advantageous. The longitudinal formability, though, is created particularly by recesses or cross cuts 14 or 15 following each other at uniform distances. These recesses or cross cuts 14, 15 begin at the rim of the mold parts 2 and 3, respectively, and leave out only an easily shaped back part. These rim recesses open up more or less in the inner mold part 2 as a function of the curvature and are pressed together in the outer mold part, so that deformations may be accepted without loss of fidelity to the shape of the mold by, for instance, deflecting inwardly or outwardly. In other words, a mold built for a certain hollow section may be used for such a section independently of the needed curvature. According to individual requirements, as they occur for instance for window enclosures and frames for older buildings, such changes are taken care of by moving the struts 12, 13 and if so needed, additional struts of identical or similar kind, in order to make the mold ready for a new shaping process.

With regard to the embodiment shown in FIG. 1, the horizontal position of the partly shown mold arch may not be a particularly preferred position, and a vertical position with a uniform accessability of the mold and particularly of slot 9 may be preferred in many occasions. The schematic illustration must be understood only as a means to make understandable the principle of the invention. For that purpose two points 16 of attachment for connecting elements are shown which have the purpose of fixing the mounting plate 4 relative to the guide plate 6, while the mounting plate 5 must be fixed immovably relative to guide plate 6.

Figure 2:
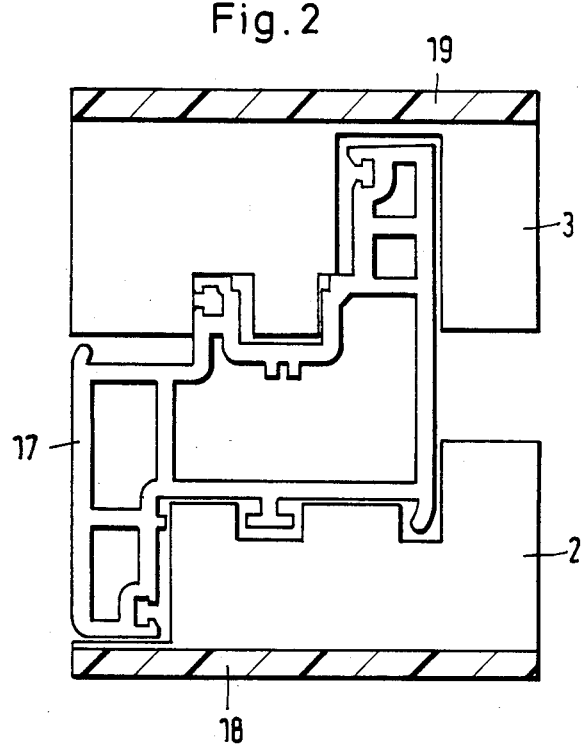
FIG. 2 is a cross sectional view of two mold parts according to FIG. 1 with an inserted section.

FIG. 2 shows an enlarged position of the mold parts 2 and 3 relative to each other and their position to a section 17 to be shaped while soft. This sectional piece 17 basically has thin walls and fine sections and is a typical product for shaping into an arch or arcuate form. The particular demands resulting from such a construction are satisfied by guiding the cross section of the sectional piece narrowly between the mold parts 2 and 3 and by preventing irregular shifting because there is no room available for such an effect.

The drawing of the cross section shows furthermore that the cross hatched rear areas 18, 19 amount to a small part of the cross section of the mold parts 2 or 3, respectively, while the rest of the cross section areas are covered by the cross recesses 14 or 15. That makes it clear that the cross section of the mold parts 2, 3 is exposed only in the rear areas 18, 19 to deformation by bending and by changes of bending while those areas which effectively carry the hollow sector do not have to bear any deformation and thus retain their nominal cross section.

Figure 3:
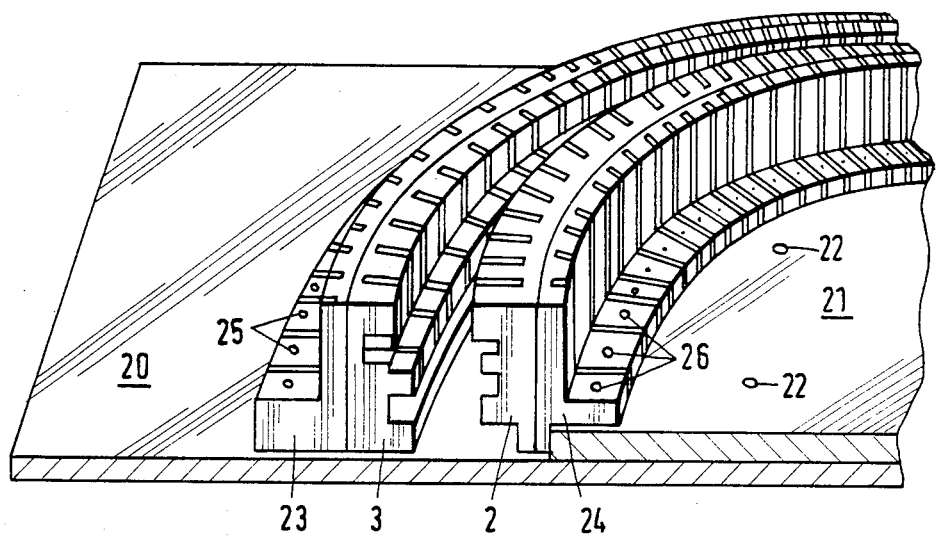
FIG. 3 is a partial perspective view of a mold according to another embodiment of the invention.
Figure 4:
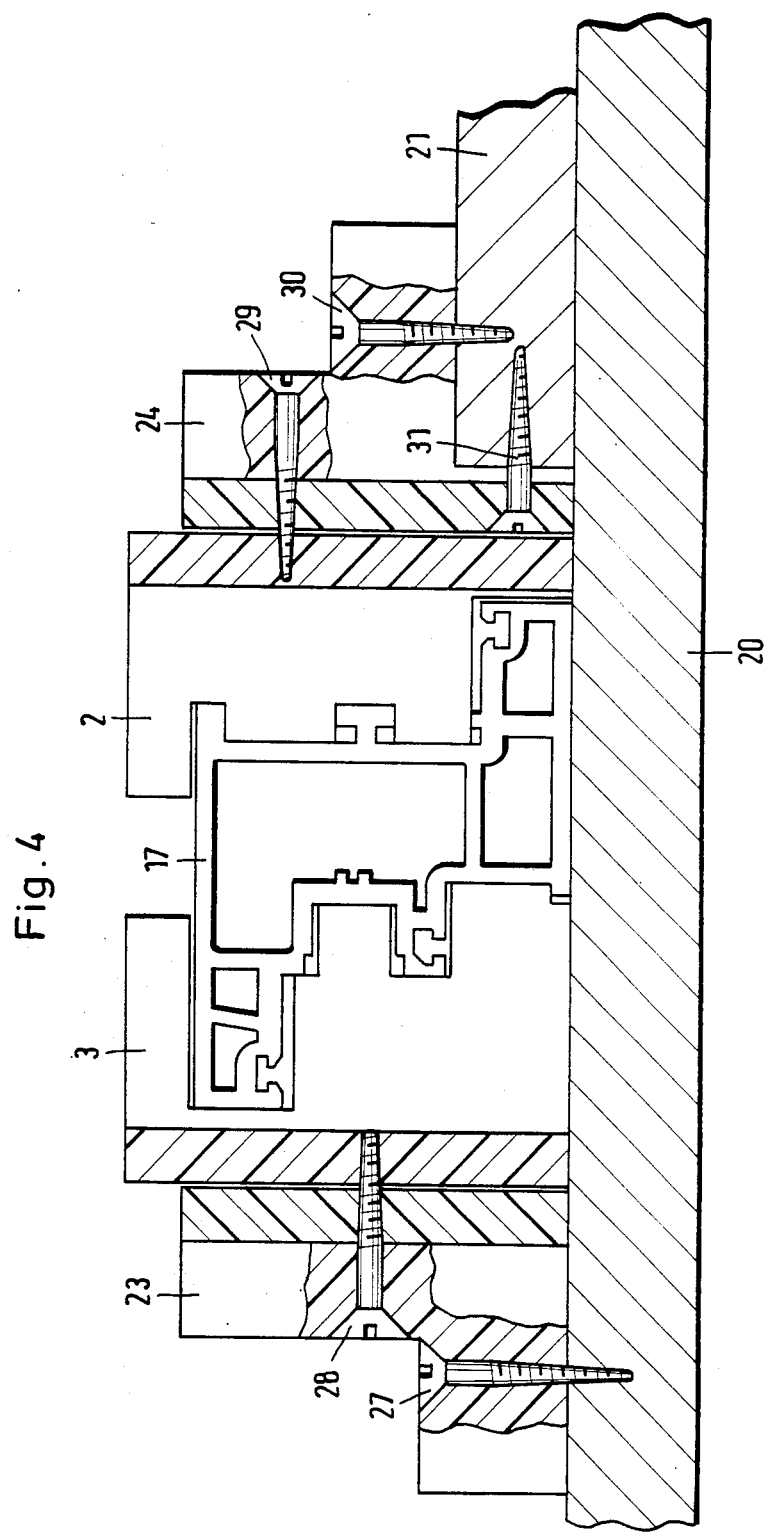
FIG. 4 is a cross sectional view of the mold according to FIG. 3 with an inserted section.

FIGS. 3 and 4 show another embodiment of the invention where corresponding mold parts 2 and 3 are used and where also identical numerals are used. The mold parts 2 and 3 in FIG. 3, however, do here not sit upon two planar mounting plates but upon two superimposed mounting plates 20 and 21, respectively. The upper plate 21 is limited by a curvilinear edge, concentrical to the shape of the mold. The plates, preferably woodchip plates, are planarly movable against each other and are capable of being arrested in the position of molding by rods, screws or the like, reaching through holes 22. These holes 22 are provided early when building the mold in order to ascertain exact centering and plate correlation.

The mold parts 2 and 3 may be used particularly simple, uniformly and also reliably mounted by the aid of two mounting or supporting molds 23 and 24 which, like the mold parts 2 and 3, are made of plastic and which are also formed comb-like by means of equidistant recesses. These comb-like recesses face towards the plane of curvature and thereby allow easy bending of the mounting or supporting molds along predetermined curves. The supporting molds 23 and 24 have a substantially L-shaped profile which assures on one hand abutting the back of mold parts 2 or 3, and on the other hand, abutting the individual mounting plate 20 or 21. The supporting molds 23 and 24 are easily connected to their respective mounting plates by screws which is facilitated by mounting holes 25 and 26, respectively, disposed within the comb tines.

FIG. 4 shows also screws 27, 28, 29, 30 and 31 which connect the supporting molds 23, 24 to the mounting plates 20, 21 and also to the mold parts 2, 3.

These supporting molds 23, 24 act in a simple manner as uniform supports requiring less expense than the supports 12, 13. drawn as in the embodiment of FIG. 1 or the otherwise needed arch shaped supports made out of woodchip material that is a few centimeters thick. Due to the rigidity of the supports, plate 21 may be made out of intermediate strength chip plate (19 mm) which allows fast and easy work and still assures safety of the mold part against dislocation, longitudinal deformation, and swivelling through the supporting mold 24.

Figure 5:
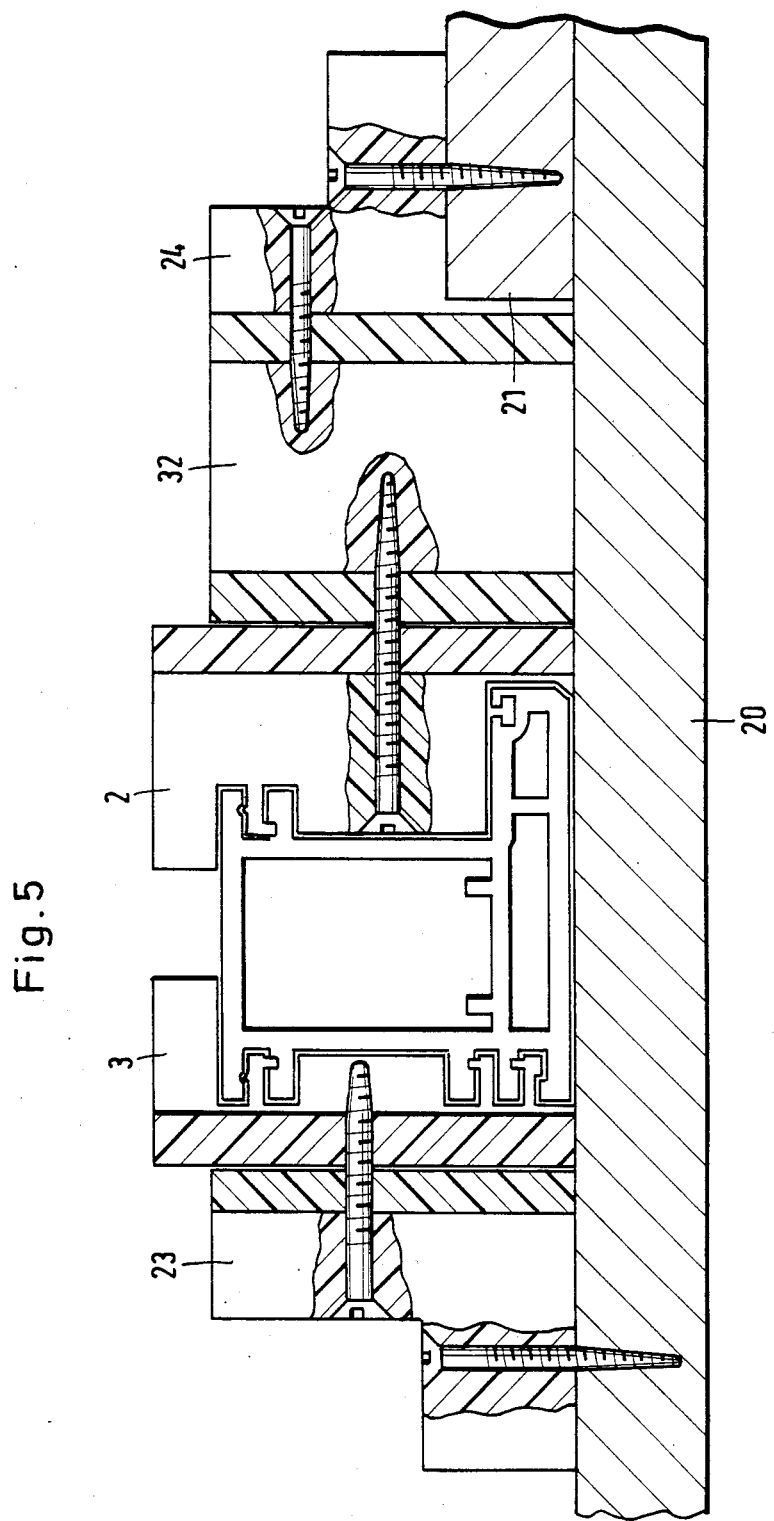
FIG. 5 is a cross sectional view of a further alternative embodiment.

FIG. 5 shows another alternate embodiment wherein, here again, respective parts are provided with the same reference numerals as in FIGS. 1 to 4 because the basic construciton has not been changed. The main change in respect to the embodiment of FIG. 5 consists in a spacer strip 32 disposed between the mold part 2 and the supporting mold 24. This spacer strip 32 is for instance 42 mm broad and causes a corresponding distance between mold part 2 and supporting mold 24. Such spacer strips may basically aid in changes of the radius in order to use an occasionally available mounting plate 21 for a slightly different radius. In this respect staggered spacer strips may also make it possible to find multiple uses for off-the-shelf stored mounting plates.

Much more important is the case that for wings of a window. At first the window frame must be bent and then the casement and a difference of the radii exists between these two, differing according to the hollow section out of which it is to be made. This difference of radii may be corrected by the use of such a spacer strip by frontally disposing the strip once, for the wings of the window, to the inner supporting mold and then, for the casement, to the outer supporting mold. Thus a simple and exact work process results by the use of common mold elements and mold adjustments.

The solid but soluble connection of spacer strip, mold part, and supporting mold, is also engineered by screws which create a simple, solid but soluble connection and are easily built, particularly from a plastic material.

The spacer strip 32 is again preferably made out of a plastic material and again is also provided, like mold parts 2, 3 and supporting molds 23, 24, with a comb-like shape by cross recesses worked in its side. This comb-like construction allows simple and uniform bending along its longitudinal extension.

What is claimed is:

1. A method for shaping an elongated softened plastic product into an arcuate configuration comprising the steps of mounting two elongated complementary bendable mold parts on a support means, bending said mold parts along their longitudinal axes to provide an arcuate path of said mold parts corresponding to the desired arcuate configuration of said product while disposing said two mold parts spaced from one another and providing a longitudinal free slot therebetween, and pulling said softened plastic product longitudinally through said mold parts by a drawing tool which extends through said slot as said mold parts slidingly engage said softened plastic product to thereby impart to said product an arcuate configuration corresponding to the arcuate configuration of said mold parts.

* * * * *